(12) United States Patent
Lo et al.

(10) Patent No.: US 11,900,035 B2
(45) Date of Patent: Feb. 13, 2024

(54) ATTRIBUTE-POINT-BASED TIMING CONSTRAINT FORMAL VERIFICATION

(71) Applicant: Taiwan Semiconductor Manufacturing Company, Ltd., Hsinchu (TW)

(72) Inventors: Chao-Chun Lo, Hsinchu (TW); Boh-Yi Huang, San Jose, CA (US); Chih-yuan Stephen Yu, San Jose, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/176,717

(22) Filed: Mar. 1, 2023

(65) Prior Publication Data

US 2023/0205958 A1    Jun. 29, 2023

Related U.S. Application Data

(62) Division of application No. 17/020,948, filed on Sep. 15, 2020, now Pat. No. 11,620,423.

(51) Int. Cl.
*G06F 30/30* (2020.01)
*G06F 30/33* (2020.01)
*G06F 119/16* (2020.01)
*G06F 119/12* (2020.01)
*G06F 111/04* (2020.01)

(52) U.S. Cl.
CPC .......... *G06F 30/33* (2020.01); *G06F 2111/04* (2020.01); *G06F 2119/12* (2020.01); *G06F 2119/16* (2020.01)

(58) Field of Classification Search
CPC .. G06F 30/33; G06F 2111/04; G06F 2119/12; G06F 2119/16; G06F 30/337; G06F 30/3323; G06F 30/3312
See application file for complete search history.

(56) References Cited

U.S. PATENT DOCUMENTS

| 5,867,395 | A | * | 2/1999 | Watkins | ................. | G06F 30/30 |
| | | | | | | 716/106 |
| 10,031,986 | B1 | * | 7/2018 | Kumar | ................ | G06F 30/3312 |
| 10,949,591 | B1 | * | 3/2021 | Elmufdi | ................ | H03M 13/09 |

(Continued)

*Primary Examiner* — Jack Chiang
*Assistant Examiner* — Brandon Bowers
(74) *Attorney, Agent, or Firm* — Jones Day

(57) ABSTRACT

Systems and methods are described herein for attribute-point-based timing formal verification of application specific integrated circuit (ASIC) and system on chip (SoC) designs. A target circuit design having a first set of netlists and timing constraints is received. A plurality of key clock-pin-net-load-setting attributes are extracted from the first ported netlists and timing constraints. The clock-pin-net-load-setting attribute mismatch in the result report is checked between the target circuit design and a golden circuit design by comparing the plurality of target attributes with a plurality of golden attributes of the golden circuit design after the target design database is loaded for static timing analysis (STA). The attribute mismatch is provided for further design or timing constraint modifications and/or updates using this approach, particularly timing formal verification, at the target technology in order to enable efficient design timing sign-off based on ported netlists and synthesis design constraints (SDC).

20 Claims, 11 Drawing Sheets

(56) References Cited

U.S. PATENT DOCUMENTS

| | | | |
|---|---|---|---|
| 11,620,423 B2* | 4/2023 | Lo | G06F 30/3323 |
| | | | 716/108 |
| 2020/0202063 A1* | 6/2020 | Innamaa | G06F 30/33 |
| 2023/0044517 A1* | 2/2023 | McDonley | G06F 30/327 |

* cited by examiner

ATTRIBUTE-POINT-BASED TIMING CONSTRAINT FORMAL VERIFICATION

CROSS-REFERENCE TO RELATED APPLICATION

This application is a divisional of U.S. patent application Ser. No. 17/020,948, filed Sep. 15, 2020, which is incorporated herein by reference in its entirety.

FIELD

The technology described in this disclosure relates generally to integrated circuit systems chip design implementation flow and more particularly to design time constraint validation when porting the design across technology nodes.

BACKGROUND

Designing application specific integrated circuits (ASIC) and System on Chips (SoC) with semiconductor devices can be a time consuming and challenging task. Design porting is a way to re-use previously designed circuit blocks in different technologies. With design porting, a circuit block from one technology can be ported to another technology. Such porting can drastically reduce design time of new ASIC and/or SoC semiconductor devices with different or alternative circuits and/or device layouts or manufacturing methods. A netlist is a list of electronic components of a circuit block and a list of nodes in which the electronic components are connected. With porting, in order to implement the structural design within a netlist, timing reverification is used to ensure that the new design meets performance goals (e.g., a desired operational clocking frequency). Timing constraints are a series of constraints applied to a given set of paths or nets that define desired performance of a particular design. Timing attributes are add-on informative tags, notes, or symbolic properties which can be adopted or queried when performing static timing analysis (STA) to the compiled design databases.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
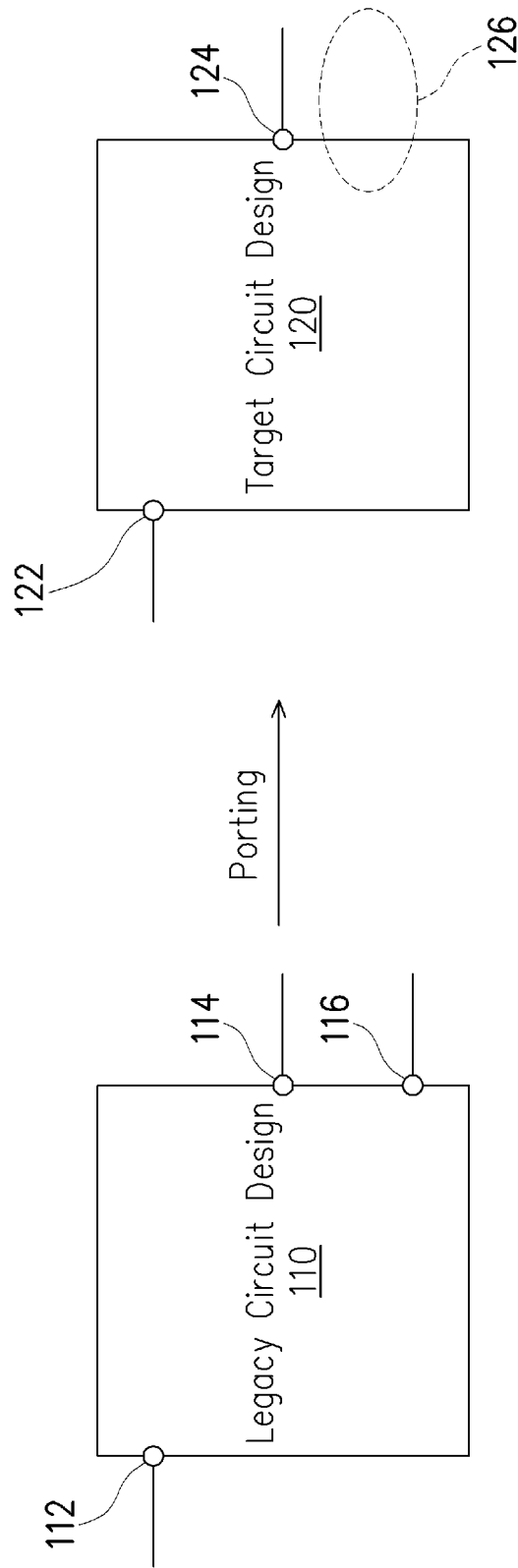
FIG. 1 illustrates an exemplary application of the use of the attribute-point-based timing constraint verification in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

For design porting from one technology to another, a legacy or golden design originally developed using one process technology can be translated to a target design using a different process technology. Porting of a design facilitates the re-use of certain previously established verification methods that were known to work for the legacy design. For example, when porting a design from 28 nm process technology (e.g., first technology process) down to a new design of 16 nm, 7 nm, and/or 5 nm process technology (e.g., second technology process), a number of previously established verification methods can be ported over to the target design. Unlike RTL design re-synthesis, design porting involving logic gate-level netlists to the target logic-gate-level netlists having similar functional behavior and synthesis design constraints (SDC) porting (e.g., SDC tool-command-language (TCL)) can require verification of timing constraints. Timing constraints can also be ported.

Timing constraints are used for front-end design compiler (DC), design compiler graphical (DCG) synthesis, and/or back-end physical synthesis. In order to port netlists of a golden circuit design to a target circuit design, timing re-verification is required to ensure that performance goals for the target design are met. Engineering tuning and/or tweaking may be needed to ensure the target design matches the golden design after porting. Foundational designs such as standard cells, memory macros, and/or intellectual property macros may not always have complete pin-to-pin compatibility with new design components such as wrappers, hierarchies, and/or repartitioning. As such, after porting, the ported design requires careful validation or verification, such as static timing closure sign-off through STA. With the attribute-point-based (e.g., features or properties of the pins of nets) timing constraint (e.g., corresponding key inputs and outputs of combo-cells or flops) formal verification methodology described herein, a number of valid timing paths within a desired or golden design are extracted and checked along with any critical attributes for pins, cases, and/or exceptions. The extracted valid timing paths along with the critical attributes are compared against cell-pin attribute reports from the performance of the ported design. Any mismatches from those reports are identified, re-validated to catch and handle those not-1-to-1 mapping mismatched ports or nets, and can be corrected within the ported design through design updates or design and SDC updates and/or modifications.

FIG. 1 illustrates an exemplary application of the use of the attribute-point-based timing constraint verification in accordance with various embodiments of the present disclosure. A legacy circuit design 110 can have a number of features described by a netlist and/or timing constraints. Legacy circuit design 110 also includes attributes 112, 114, 116 (e.g., points, pins, information) that are critical for the operation of that particular circuit. Legacy circuit design 110 can be, for example, a design for 28 nm process technology. As electronic devices continue to decrease in size, the circuit designs within those devices also decrease. The functionality and/or verification methods of the legacy circuit design 110 can be maintained through design porting. Such porting obviates the need for a complete redesign of a circuit when attempting to decrease its size. For example, legacy circuit design 110 can be ported to a target circuit design 120 that uses a smaller process technology such as 16 nm, 7 nm, and/or 5 nm process technology. With porting, there may be some design features of legacy circuit design 110 that are combined within target circuit design 120 so as to decrease its size. The combination of these design features may cause an attribute mismatch between legacy circuit design 110 and target circuit design 120. For example, as illustrated in FIG. 1, target circuit design 120 may only have two attributes 122, 124 rather than the three attributes 112, 114, 116 of legacy circuit design. In order to ensure that target circuit design 120 carries over the intended functionality and/or verification features of legacy circuit design 110, an analysis of attribute mismatches at the attribute level is performed. Any attribute mismatches between legacy circuit design 110 and target circuit design 120, such as the missing attribute 126, which could require design or SDC updates after porting, are identified and provided to either a circuit designer or an automated design system for appropriate correction.

Figure 2:
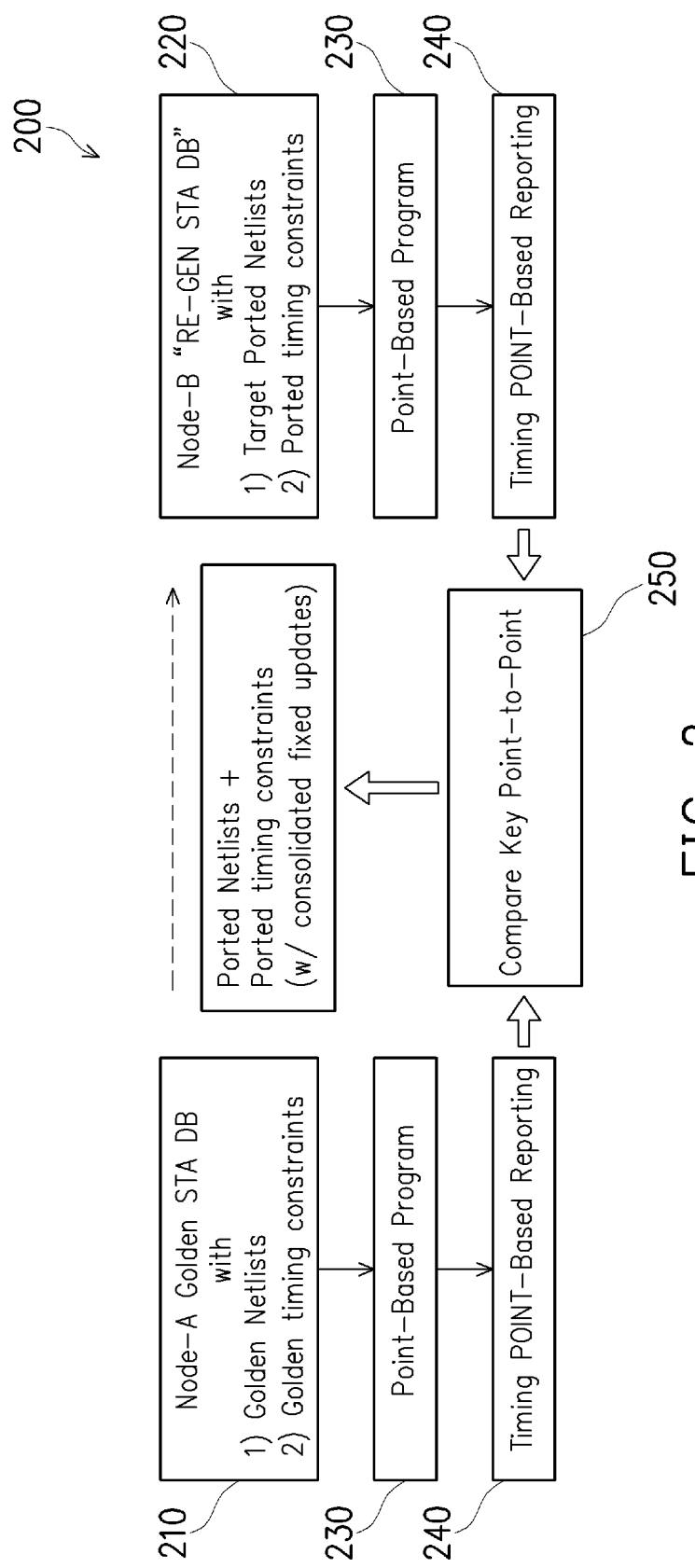
FIG. 2 illustrates an exemplary process flow diagram illustrating attribute-point-based timing constraint formal verification in accordance with various embodiments of the present disclosure.

FIG. 2 illustrates an exemplary process flow diagram 200 illustrating attribute-point-based timing constraint verification in accordance with various embodiments of the present disclosure. Static timing analysis (STA) is a type of timing-arc-delay calculation or timing-path-delay calculation. STA database (DB) is a database that stores extracted STA features of particular circuit designs such as STA path-delays and/or STA design point attribute information. As illustrated in FIG. 2, a legacy or golden design (e.g., Node A Golden) is stored in a STA DB 210. The STA DB 210 includes netlists and timing constraints associated with the golden design such as netlists and timing constraints associated with a 28 nm process technology design. Those golden netlists and timing constraints can be ported to another STA DB such as a regenerated STA DB 220 (e.g., Node-B RE-GEN") to create a new design such as a 3 μm, 1.5 μm, 1.2 μm, 1.0 μm, 0.8 μm, 0.6 μm, 0.5 μm, 0.35 μm, 0.25 μm, 0.18 μm, 0.13 μm, 90 nm, 65 nm, 40 nm, 28 nm, 22 nm, 20 nm, 16 nm, 12 nm, 10 nm, 7 nm, 6 nm, 5 nm, and/or 3 nm process technology design and the like. STA DB 220 includes ported target netlists and timing constraints. The target design may not, however, have an exact pin layout as the golden design due to, for example, the change in size of the process technology or foundation cell and macro layout architectures, but with the same behavior function of standard cells and/or memory macros. Because of this potential mismatch, there may be some unmapped pins or other cell information in the target design. Additionally, some timing constraints of the golden design may be dropped from or consolidated within the STA DB 220. A point-based program 230 generates a timing-point based report 240 that identifies various attributes of false paths, multi-cycle paths, and/or case-value settings. The point based program 230 checks each attribute (e.g., false paths, multi-cycle paths, and/or case value settings) one at a time (e.g., point-by-point). The timing-point based report 240 lists timing attributes associated with each pin. The point-based program 230 carries out attribute-point-based timing constraint formal verification (FV) by checking the attributes point-by-point. By splitting the evaluation into stages, mismatches between the golden and target circuit design can be identified more quickly. In a first stage, a log for SDC is checked for any errors. If new ported SDCs are not verified, the design tool engine and timing tool engine cannot load the design for analyses and simulations properly, which in turn may cause the programs and/or process flows to stop for implementation and verification. Such errors can identify issues with the ported design (e.g., target design) not complying with basic design requirements. Attributes of all sequential cells and pins are evaluated between the two designs (e.g., a golden circuit design and a target circuit design). In a second stage, the attributes of all timing paths (e.g., example timing paths include endpoint_clock, startpoint_clock, startpoint_input_delay_value, endpoint_output_delay_value, dominan_exception, etc.) are evaluated. In a third stage, the number of timing paths for each cell between the netlist of the golden and target circuit designs are compared to ensure it is the same number of timing paths in each cell.

The attributes identified within the timing-point based report 240 are deemed essential for porting to the target circuit design. The timing-point based report 240 generated based on STA DB 210 and STA DB 220 are compared against each other using a key point-to-point comparison 250. The key point-to-point comparison 250 compares each attribute one by one (e.g., point-to-point). Any issues with each attribute between the golden circuit design and the target circuit design, such as missing attributes and/or incorrect attributes are identified with the key point-to-point comparison 250. These attributes are then provided to a user and/or an automated system for potential redesigns of the target circuit design (e.g., to achieve exactly the same functions of the original golden design behaviors and functionalities).

Figure 3:
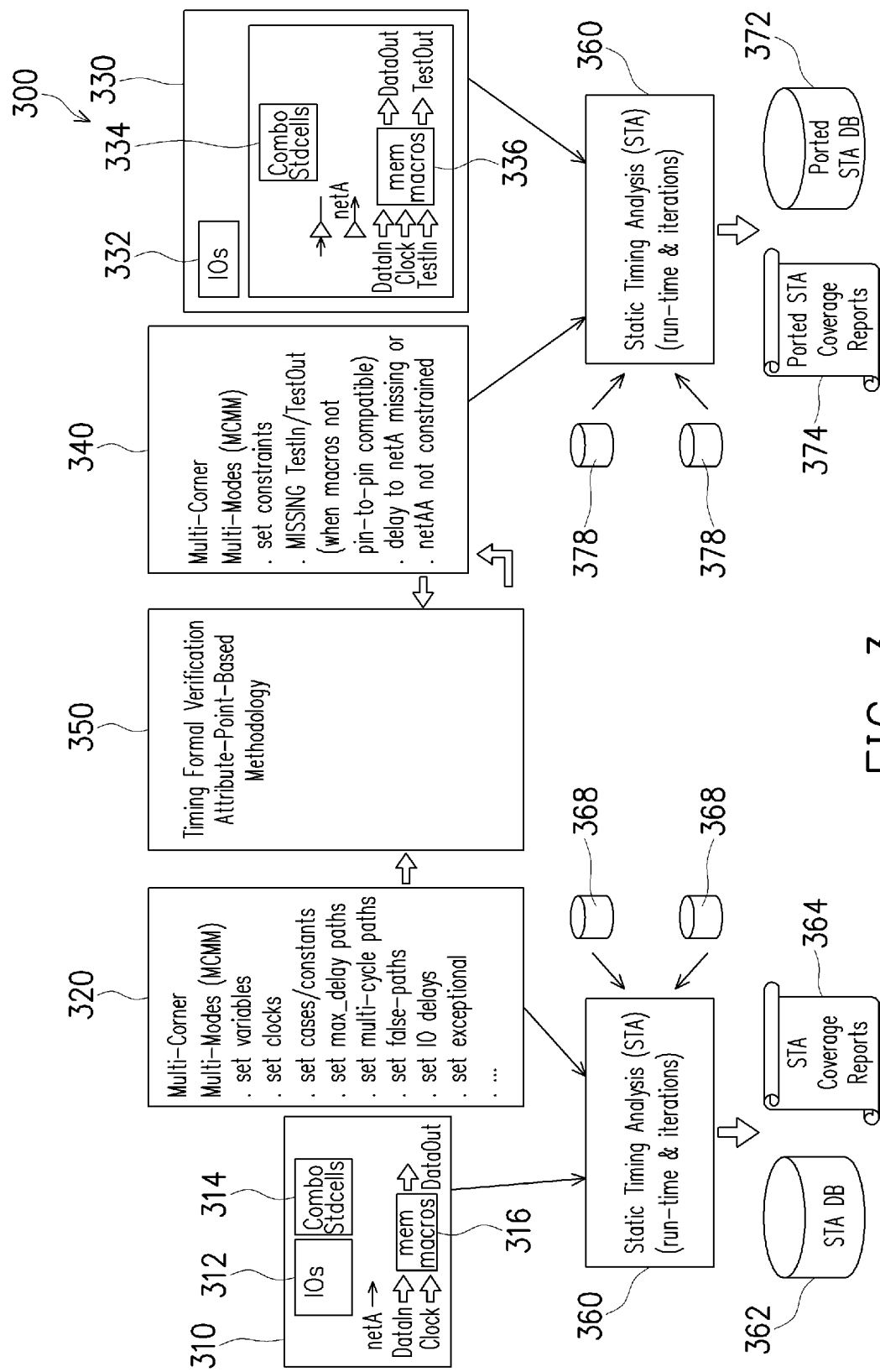
FIG. 3 illustrates another exemplary process flow diagram for attribute-point-based timing constraint verification in accordance with various embodiments of the present disclosure.

FIG. 3 illustrates another exemplary process diagram 300 for attribute-point-based timing constraint verification (e.g., comparing each attribute between a golden design and a target circuit design) in accordance with various embodiments of the present disclosure. In the embodiment illustrated in FIG. 3, a golden circuit design 310 includes input/output (IO) components 312, standard cells (e.g., stdcells) 314, and memory macro components 316. Memory macro components 316 receive both data and clock inputs and output data. Golden circuit design 310 includes a number of golden timing constraints 320 such as multi-corner multi-modes (MCMM) constraints. Example multi-corner multi-mode constraints include variables, clocks, cases/constants, maximum delay paths, multi-cycle paths, false-paths, IO delays, and/or exceptions. With MCMM analysis, multiple design points are used to determine the effects of environmental and/or operational characteristics caused by the manufacturing process. For example, golden timing constraints 320 can include constraints that set variables, clocks, cases/constants, maximum delay paths, multi-cycle paths, false paths, IO delays, and/or other exceptions. The golden circuit design 310 is ported to a target circuit design 330 having physical hierarchy re-partitions. Circuit designs are divided into small blocks (e.g., partitions) based on functions performed by a subset of components. Those partitions can be arranged in a physical hierarchy. Because of the different physical sizes between a target circuit design 330 and a golden circuit design 310, the partitions from the golden circuit design 310 may not be mapped one-for-one to the target circuit design 330. As such, the target circuit design 330 may be re-partitioned. In other words, the standard cells 334 are combined together and the IO components 332 are in a different level of the circuit hierarchy. Additionally, the memory macro components 336 receive not only data and clock signals as inputs, but also test inputs. Memory macro components 336 also output additional test outputs that were not generated by the golden circuit design 310. The timing constraints 340 associated with the target circuit design 330 can also include MCMM constraints, but because the golden circuit design 310 did not include the test input and output pins, these are missing from timing constraints 320. By comparing the timing constraints 320 of golden circuit design 310 with those timing constraints 340 of target circuit design 330 using attribute-point-based timing constraint FV 350 by checking the attributes point-by-point, the missing test input and output pin constraints can be identified and fixed or added on. Traditional STA methods 360 can be used to generate the STA DB 362, STA DB 372 along with STA coverage reports 364, 374 of the golden circuit design 310 and target circuit design 330. STA 360 can utilize additional database resources such as golden circuit design libraries 368 and target circuit design libraries 378 to perform simulations computing expected timing of a digital circuit (e.g., particular circuits within target circuit design 330) without requiring a simulation of target circuit design 330. Ultimately, however, any design mismatches, reported by the programs, between golden circuit design 310 and target circuit design 330 are identified through the attribute-point-based timing constraint FV 350, as opposed to during STA 360.

Figure 4:
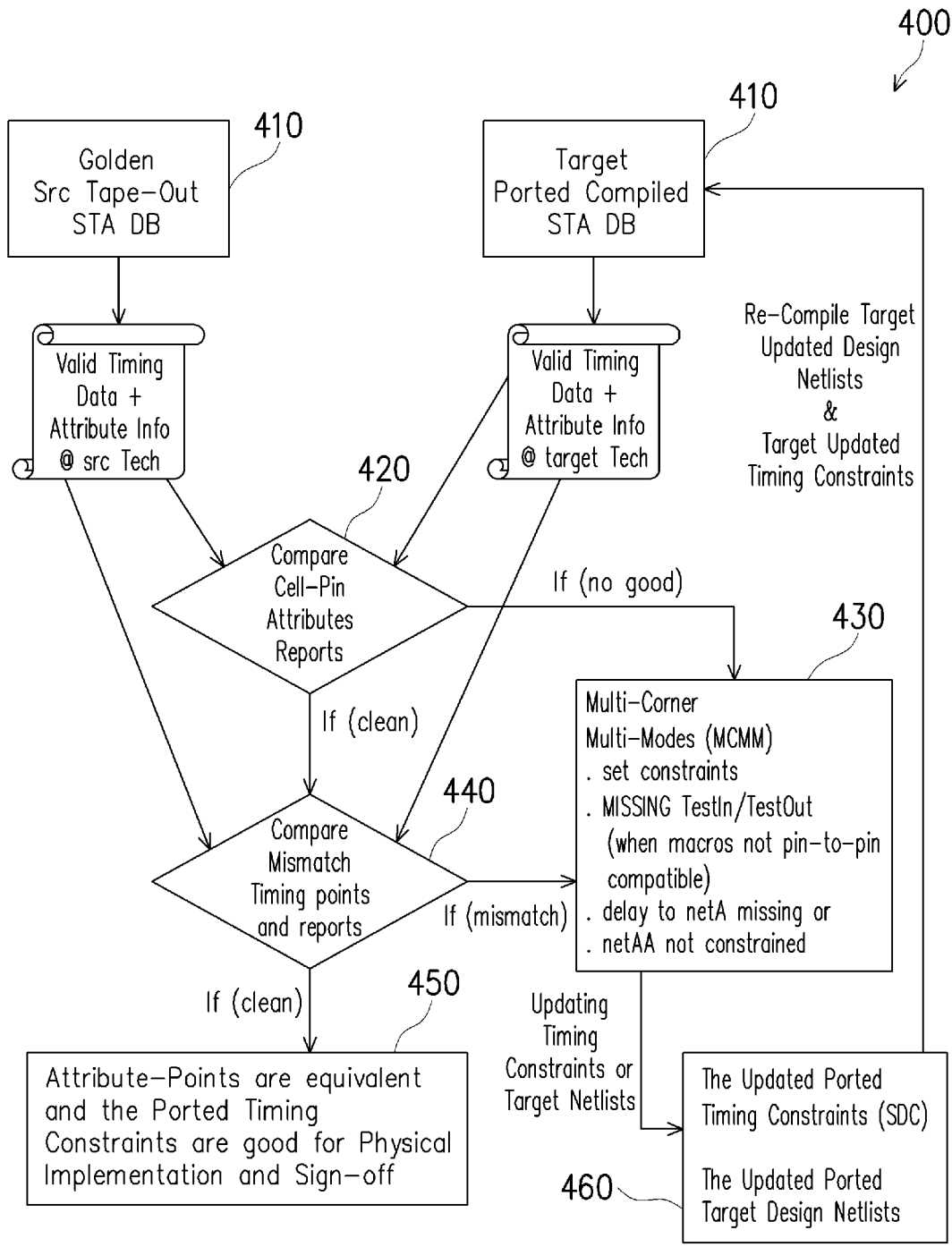
FIG. 4 illustrates another exemplary process flow diagram of attribute-point-based timing constraint formal verification in accordance with various embodiments of the present disclosure.

FIG. 4 illustrates another exemplary process flow diagram 400 of attribute-point-based timing constraint FV by checking the timing attributes point-by-point in accordance with various embodiments of the present disclosure. Valid timing paths and any critical attributes for pins, cases, and/or exceptions are extracted, at 410, from a golden circuit design and a target circuit design. Whether an attribute mismatch exists between the golden circuit design and the target circuit design is determined based on a comparison between attribute reports, at 420. If an attribute mismatch is identified, the timing constraints of the target gate design (e.g., ported design) are modified to cure the attribute mismatch. Such modification can be made by a user manually modifying the target circuit design or through use of an automated tool to modify the design. With a modified design, the corresponding netlist and timing constraints 430 are also updated to reflect that design (e.g., updated ported timing constraints (SDC)/updated ported target design netlists 460). These updated ported timing constraints (SDC)/updated ported target design netlists 460 are re-complied and provided back to the target database. If, however, there are no attribute mismatches identified then a comparison of timing points is performed, at 440, to identify timing mismatches. If there are no timing point mismatches, then at 450, the attributes-points are equivalent (e.g., each attribute evaluated point-by-point matches between the golden circuit design 310 and the target circuit design 330) and the ported timing constraints are sufficient for physical implementation and sign-off. Netlists to netlists should be approximately 100% matched in terms of functionality. SDC to SDC constraints should be properly matched or correlated so that the timing check to the design can be properly loaded in the implementation and verification tools and programs.

Figure 5:
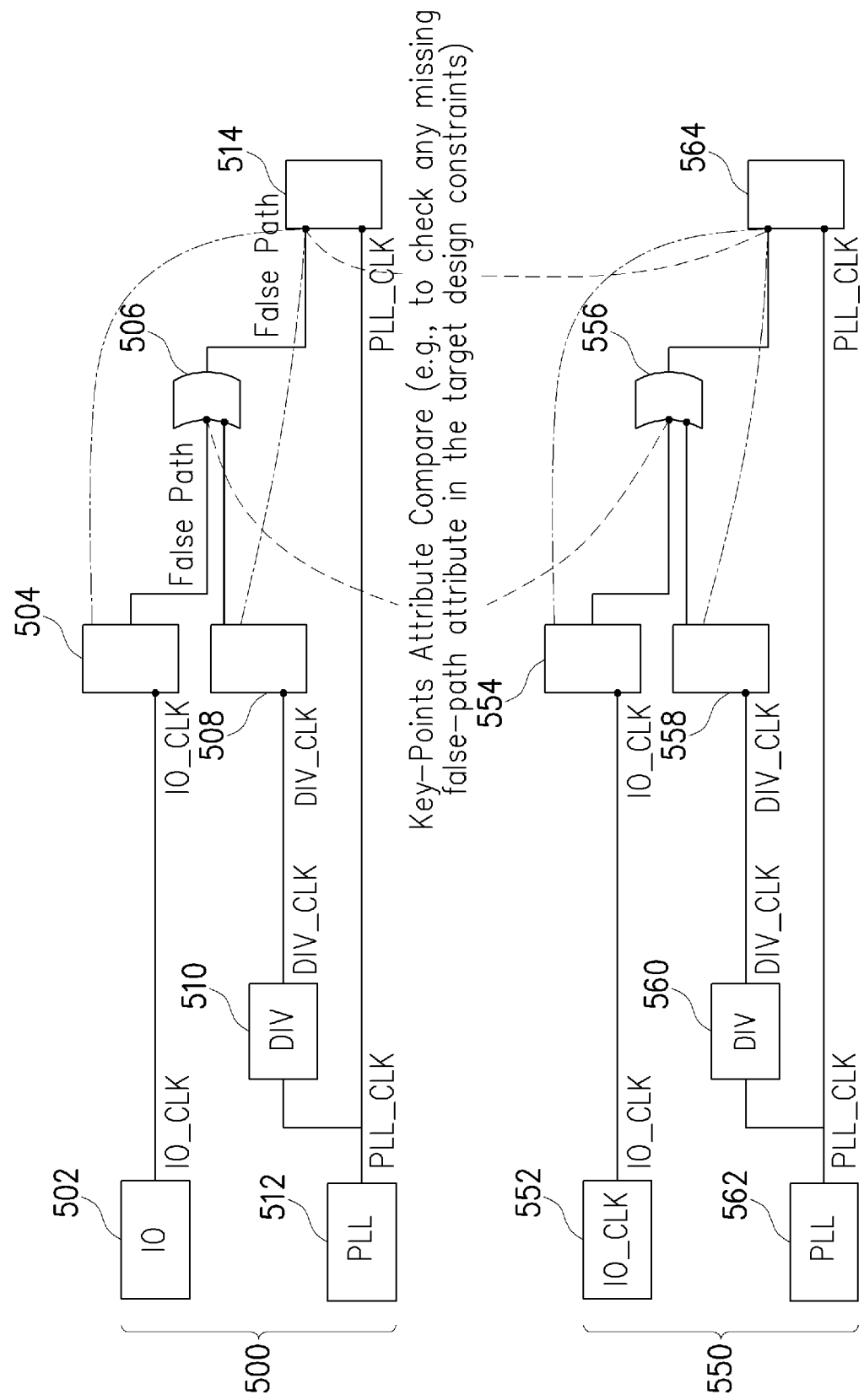
FIG. 5 illustrates an exemplary golden circuit design and an exemplary target circuit design in accordance with various embodiments of the present disclosure.

FIG. 5 illustrates an exemplary golden circuit design 500 and an exemplary target circuit design 550 in accordance with various embodiments of the present disclosure. An attribute-point-based timing constraint FV as described in detail in FIGS. 1-4 can be used to validate the target circuit design 550 by comparing each attribute point-by-point between the target circuit design 550 and the golden circuit design 500. Golden circuit design 500 in accordance with the embodiment illustrated in FIG. 5 shows the timing paths in the paths arcs. Golden design includes an IO component 502 that generates and provides a clock signal (e.g., IO_CLK) to a flip-flop 504. The output of flip-flop 504 is coupled to a logic gate 506 (e.g., OR gate). Logic gate 506 compares the output of flip-flop 504 with an output of flip-flop 508. Flip-flop 508 receives a clock input (e.g., DIV_CLK) from a clock divider 510 (e.g., DIV). Clock divider 510 divides a clock signal (e.g., PLL_CLK) received from a phase-locked loop (PLL) component 512. Another flip-flop 514 receives the clock signal (e.g., PLL_CLK) from PLL component 512 along with the output of the logic gate 506. In this particular golden circuit design 500, flip-flops 504, 508, and 514 are integral or key components. As a result, there needs to be a one-to-one compatible correlation between the golden circuit design 500 and the target circuit design 550. The target circuit design 550 must also have similar data paths as the golden circuit design 500. Target circuit design 550 appears to include similar physical components as golden circuit design 500 such as an I/O component 552, flip-flops 554, 558, 564, logic gate 556, clock divider 560, and PLL component 562. Yet, if comparison at the attribute-pin level identifies that golden circuit design 500 and target circuit design 550 are not equivalent (e.g., that the attributes between the target circuit design 550 and the golden circuit design 500 do not match) and target circuit design 550 requires additional changes or updates. For example, such changes or updates can include constraint updates due to false path re-declarations at target 550 circuit after attribute-point information comparison.

For each node of the key components of flip-flops 504, 508, and 514, there is a corresponding attribute that is extracted and validated. In the example illustrated in FIG. 5, golden circuit design includes three clock attributes of importance, IO_CLK, DIV_CLK, and PLL_CLK, and two false path data attributes. A false path is a data attribute that can be ignored during timing analysis as it is a timing path that is capable of being captured even after a large interval of time has passed but still produces the required output. A report is generated based on the attributes of the golden circuit design 500 and compared against a report generated based on the attributes of the target circuit design 550. The reports can be, for example, a text file or comma-separate values (csv) file describing the attributes. These two reports are compared against each other to determine that the target circuit design 550 is missing the two false path data attributes. These missing false paths (e.g., validation failures) are identified and highlighted to a user (e.g., via an alert message or generated validation report). The attribute comparison as described herein can be performed between logic gate 506 and logic gate 556 as well as between flop-flop 514 and flip-flop 564. Such comparison checks to determine whether any false-path attributes within the target design constraints.

Figure 6:
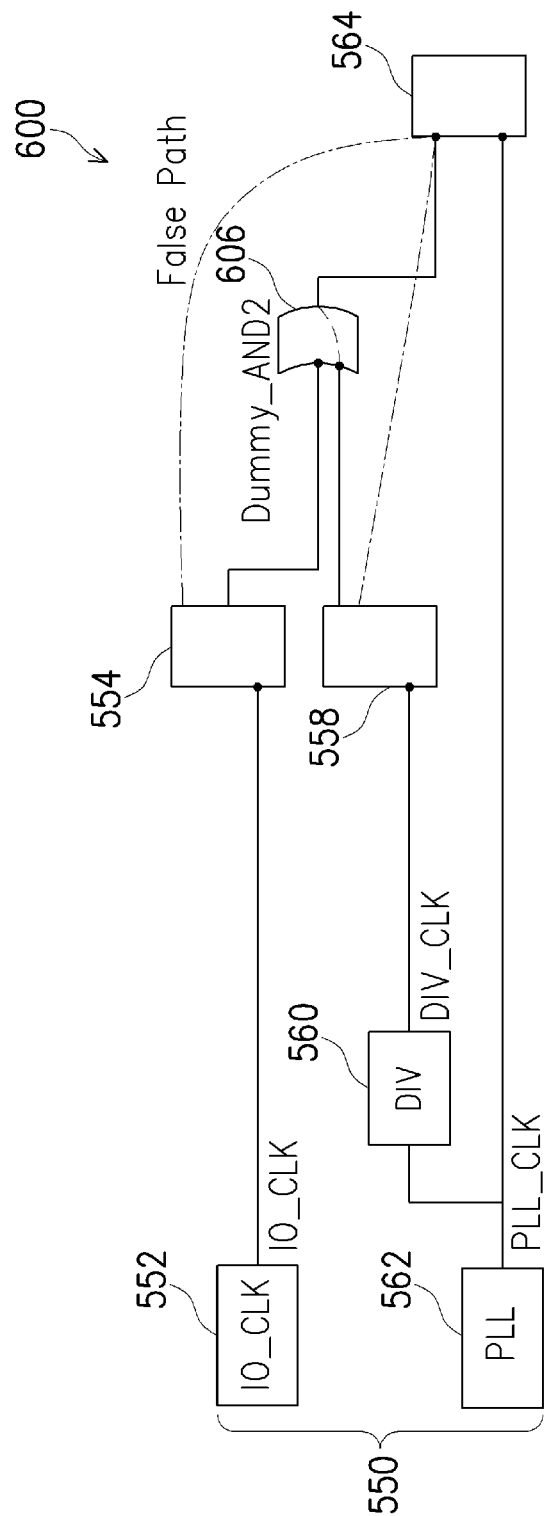
FIG. 6 illustrates an exemplary target circuit design having corrected the identified validation failures of target circuit design in accordance with various embodiments of the present disclosure.

FIG. 6 illustrates an exemplary target circuit design 600 having corrected the identified validation failures of target circuit design 550 in accordance with various embodiments of the present disclosure. The netlist and attribute list of target circuit design 600 were updated in order to add a false path within OR gate 606.

Figure 7:
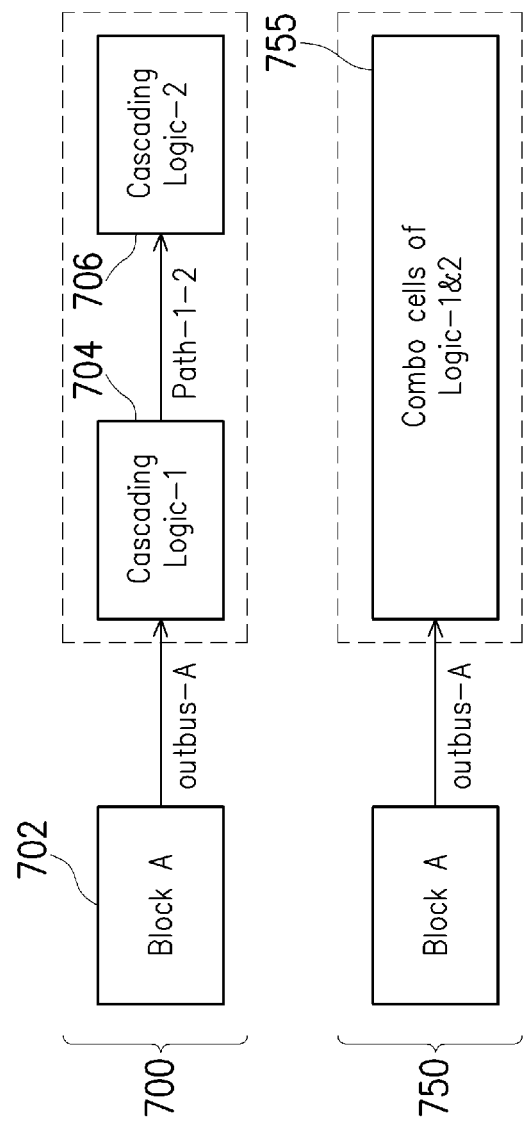
FIG. 7 illustrates another exemplary golden circuit design and corresponding target circuit design that can be validated using the attribute-point-based timing constraint formal verification methodology described herein in accordance with various embodiments of the present disclosure.

FIG. 7 illustrates another exemplary golden circuit design 700 and corresponding target circuit design 750 that can be validated using the attribute-point-based timing constraint FV methodology described herein in accordance with various embodiments of the present disclosure. Golden circuit design 700 can include a first block of components (e.g., Block A 702) that output signals to a set of cascading logic components (e.g., cascading logic-1 704 and cascading logic-2 706). When porting to a target circuit design 750, the cascading logic-1 704 and cascading logic-2 706 components can be combined into a single component of combination cells 755 (e.g., for the purpose of performance, power, and area (PPA)). The ported timing constraints of target circuit design of path-1-2 are unmapped as the combination cell paths do not exist within the golden circuit design 700. Such unmapped constraints can be identified using the attribute-point-based timing constraint FV methodology described herein as the point-by-point comparison of the attributes between the target circuit design 750 and the golden circuit design 700. In other words, if there are ported timing constraints of the target circuit design 750 do match point-by-point with the golden circuit design 700, this will be identified during the point-by-point comparison and can be remedied.

Figure 8:
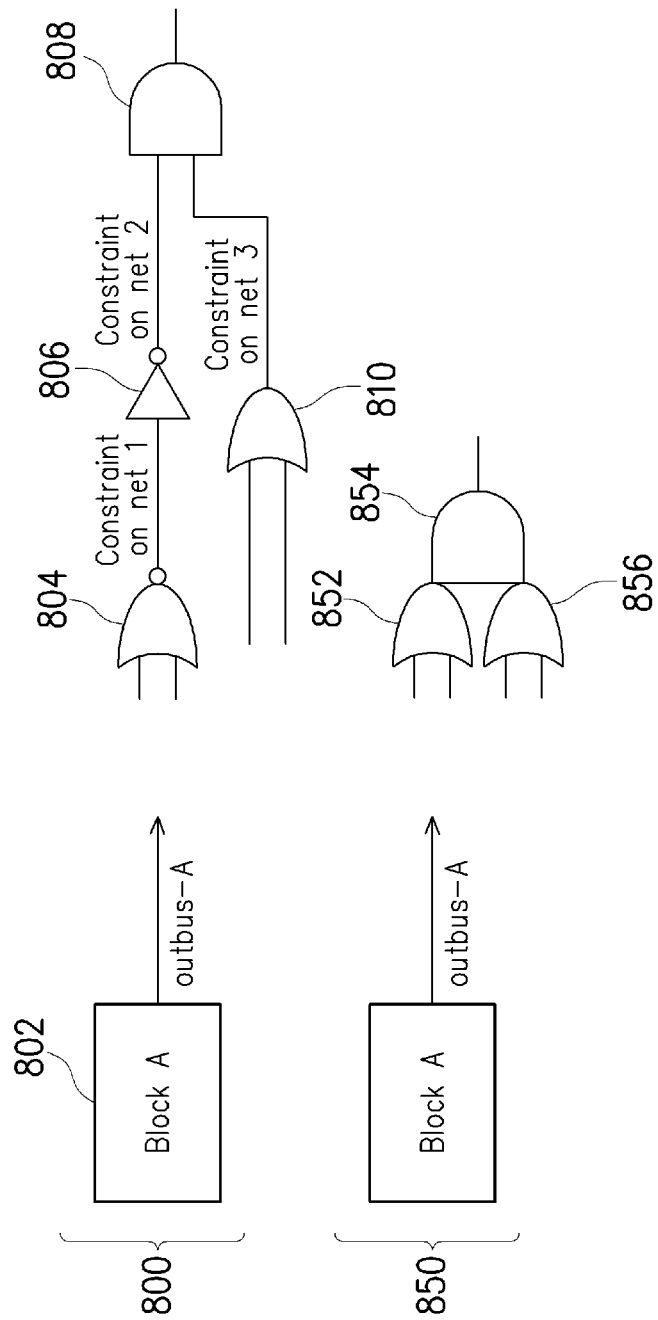
FIG. 8 illustrates another exemplary golden circuit design and corresponding target circuit design that can be validated using the attribute-point-based timing constraint formal verification methodology described herein in accordance with various embodiments of the present disclosure.

FIG. 8 illustrates another exemplary golden circuit design 800 and corresponding target circuit design 850 that can be validated using the attribute-point-based timing constraint FV methodology described herein in accordance with various embodiments of the present disclosure. Golden circuit design 800 can include a first block of components (e.g., Block A 802) that output signals to a set of logic gates 804, 806, 808, 810. The logic gates 804, 806, 808, 810 are condensed down to a smaller number of logic gates (e.g., logic gates 852, 854, 856) in target circuit design 850. With this porting, however, constraints on net 1, net 2, and net 3 of golden circuit design no longer exist within target circuit design 850 and are thus unmapped. Such unmapped constraints can be identified using the attribute-point-based timing constraint FV methodology described herein as the point-by-point comparison of the attributes between the target circuit design 850 and the golden circuit design 800. In other words, if there are ported timing constraints of the target circuit design 850 do match point-by-point with the golden circuit design 800, this will be identified during the point-by-point comparison and can be remedied.

Figure 9:
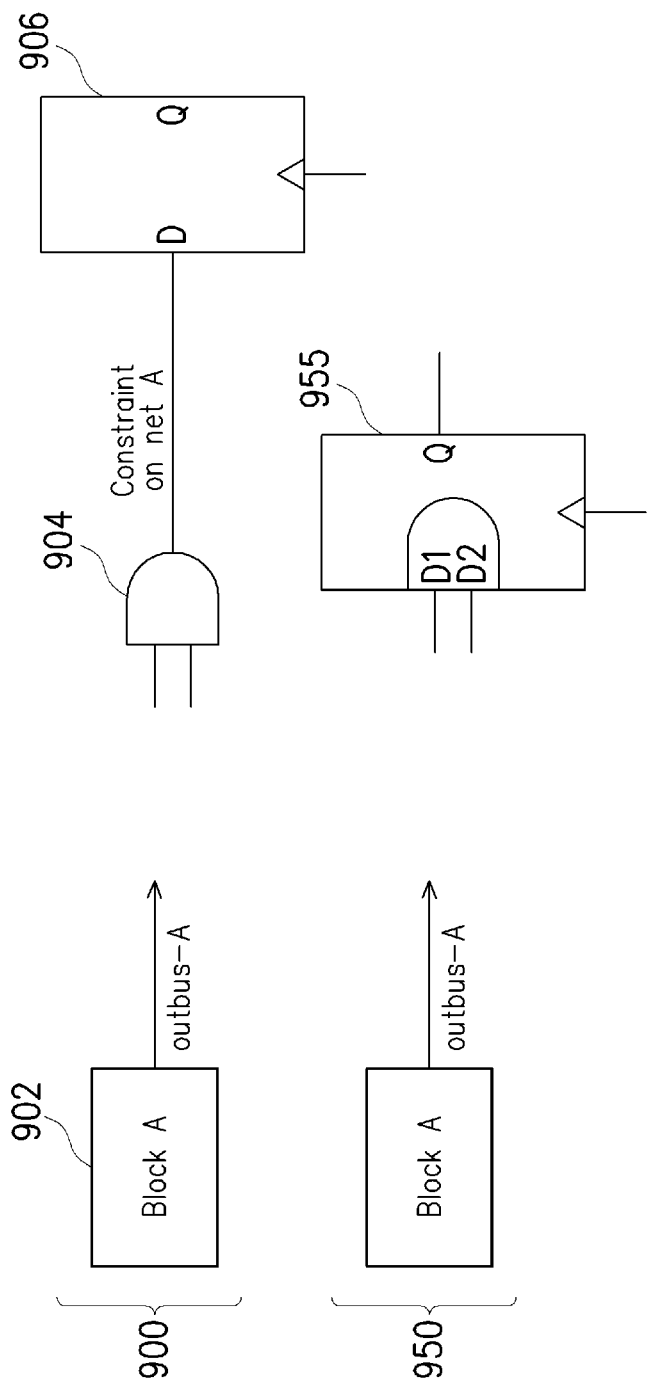
FIG. 9 illustrates another exemplary golden circuit design and corresponding target circuit design that can be validated using the attribute-point-based timing constraint formal verification methodology described herein in accordance with various embodiments of the present disclosure.

FIG. 9 illustrates another exemplary golden circuit design 900 and corresponding target circuit design 950 that can be validated using the attribute-point-based timing constraint FV methodology described herein in accordance with various embodiments of the present disclosure. Golden circuit design 900 can include a first block of components (e.g., Block A 902) that output signals to a logic gate 904 and flip-flop 906. Target circuit design 950 includes a combinational flip-flop 955 rather than a separate logic gate and flip-flop. With porting of golden circuit design 900, the constraints on net A are unmapped as such path does not exist within target circuit design 950. Such unmapped constraint can be identified using the attribute-point-based timing constraint FV methodology described herein.

Notwithstanding the example applications described herein, one of skill in the art can appreciate that the technology being ported and validated using techniques described herein can be applied to a number of golden circuit designs including, but not limited to, standard cells, static random access memory (SRAM), I/O components, PLLs, analog-macros, system on chip (SoC) designs, and/or application-specific integrated circuits (ASICs).

Figure 10:
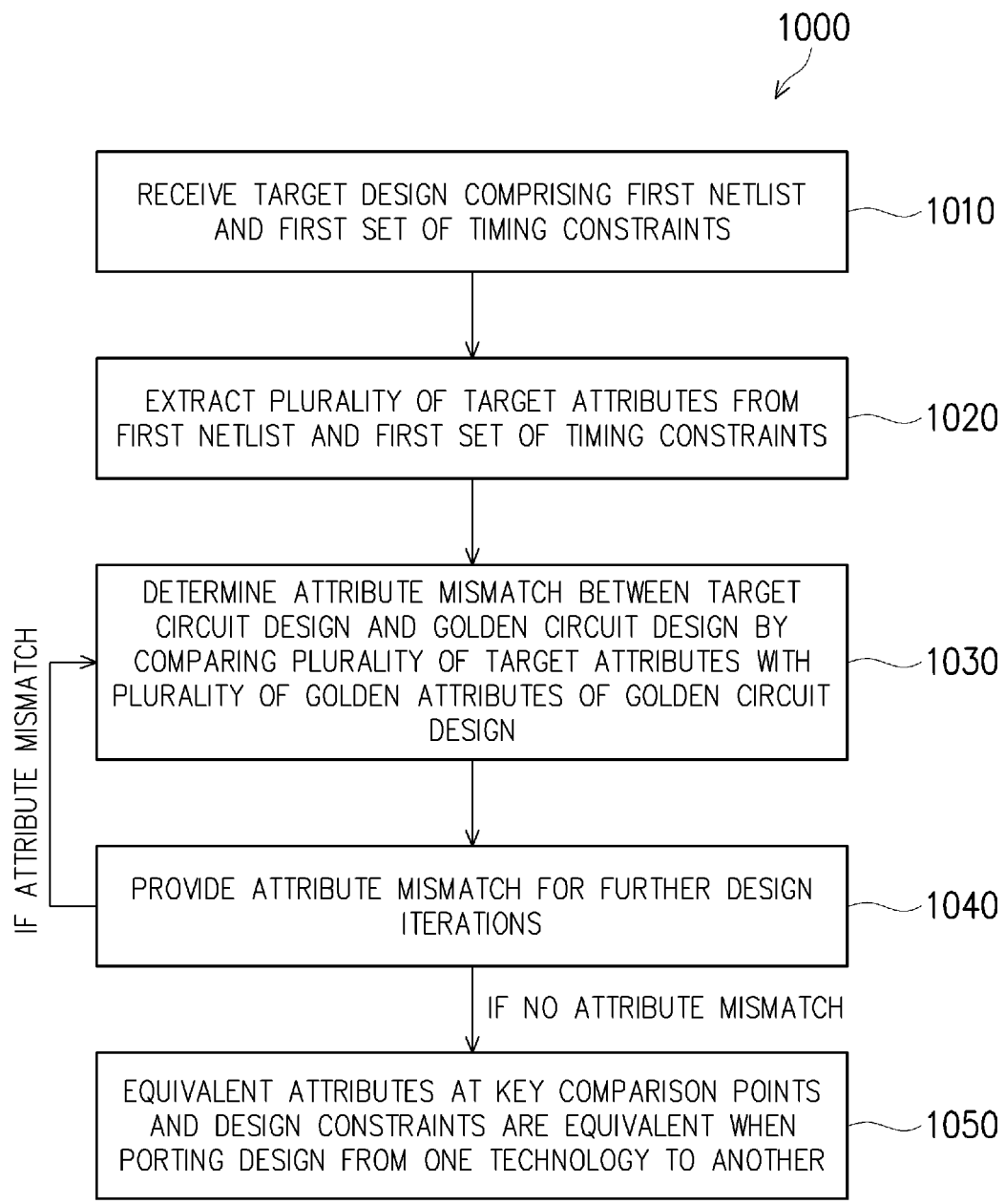
FIG. 10 is a flow chart of an exemplary method of attribute-point-based timing constraint formal verification in accordance with various embodiments of the present disclosure.

FIG. 10 is a flow chart 1000 of an exemplary method of attribute-point-based timing constraint FV in accordance with various embodiments of the present disclosure. The method is applicable to a wide variety of underlying structures. A target design having a first netlist and first set of timing constraints is received, at 1010. A plurality of target attributes from the first netlist and the first set of timing constraints are extracted, at 1020. An attribute mismatch between the target circuit design and the golden circuit design are determined, at 1030, by comparing the plurality of target attributes with a plurality of golden attributes of the golden circuit design. The attribute mismatch is provided, at 1040, for further design iterations. If there is no attribute mismatch, at 1050, then there are equivalent attributes at key comparison points and/or the design constraints are equivalent when porting designs from one technology to another. If there is attribute mismatch, then that mismatch is analyzed as described in step 1030.

Figure 11:
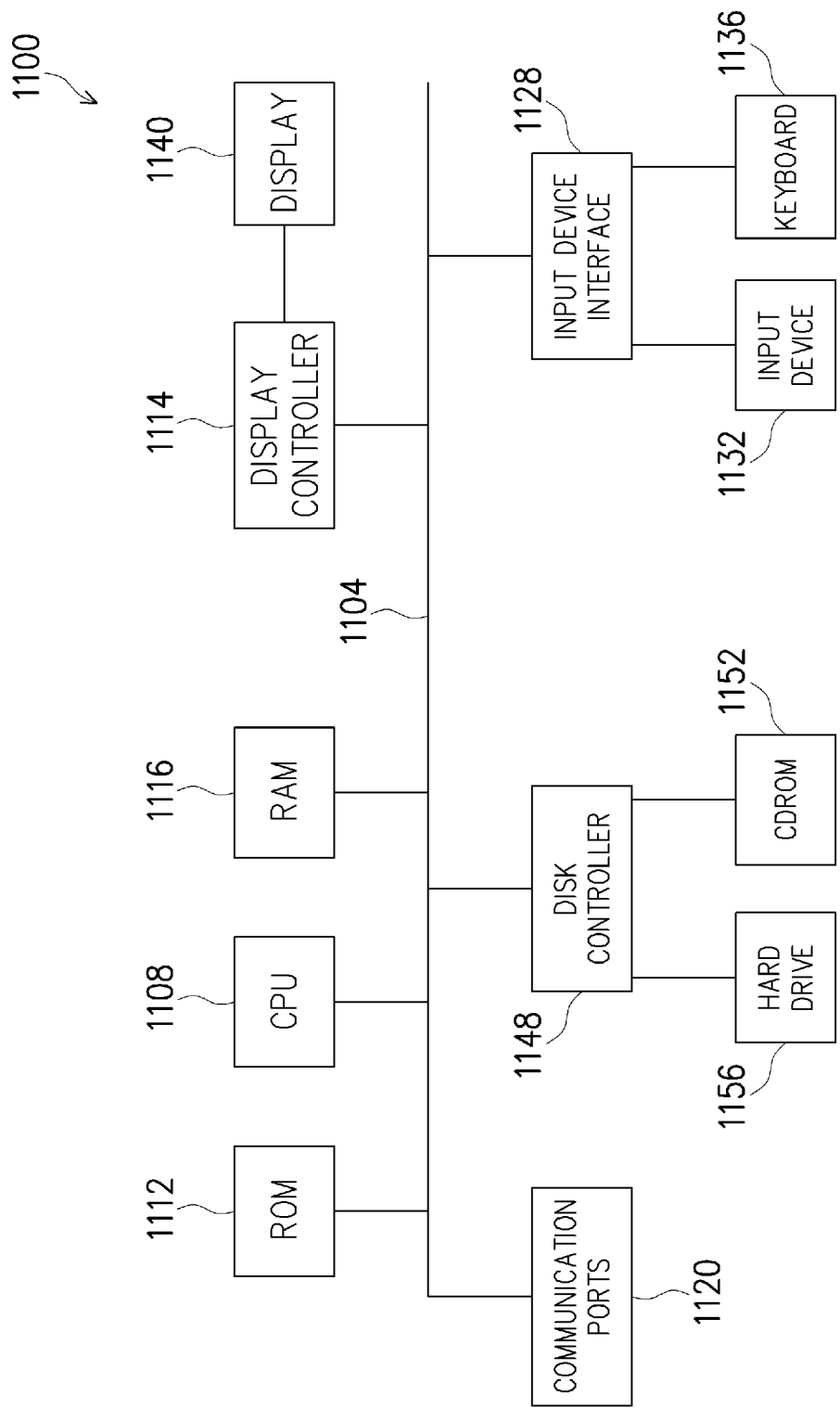
FIG. 11 is a diagram illustrating a sample computing device architecture for implementing various aspects described herein in accordance with various embodiments of the present disclosure.

FIG. 11 is a diagram 1100 illustrating a sample computing device architecture for implementing various aspects described herein. A bus 1104 can serve as the information highway interconnecting the other illustrated components of the hardware. A processing system 1108 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1112 and random access memory (RAM) 1116, can be in communication with the processing system 1108 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1148 can interface one or more optional disk drives to the system bus 1104. These disk drives can be external or internal CD-ROM, CD-R, CD-RW or DVD, or solid state drives such as 1152, or external or internal hard drives 1156. As indicated previously, these various disk drives 1152, 1156 and disk controllers are optional devices. The system bus 1104 can also include at least one communication port 1120 to allow for communication with external devices either physically connected to the computing system or available externally through a wired or wireless network. In some cases, the communication port 1120 includes or otherwise comprises a network interface.

To provide for interaction with a user, the subject matter described herein can be implemented on a computing device having a display device 1140 (e.g., a CRT (cathode ray tube) or LCD (liquid crystal display) monitor) for displaying information obtained from the bus 1104 to the user and an input device 1132 such as keyboard 1136 and/or a pointing device (e.g., a mouse or a trackball) and/or a touchscreen by which the user can provide input to the computer. Other kinds of input devices 1132 can be used to provide for interaction with a user as well; for example, feedback provided to the user can be any form of sensory feedback (e.g., visual feedback, auditory feedback by way of a microphone or tactile feedback); and input from the user can be received in any form, including acoustic, speech, or tactile input. The input device 1132 and the keyboard 1136 can be coupled to and convey information via the bus 1104 by way of an input device interface 1128. Other computing devices, such as dedicated servers, can omit one or more of the display 1140 and display interface 1114, the input device 1132, the keyboard 1136, and input device interface 1128.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, Perl, Python, Tcls, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Use of the various circuits and configurations as described herein can provide a number of advantages. For example, use of the attribute-point-based approach described herein can identify missing false path constraints, multi-cycle paths, and/or clock settings. The use of this approach can decrease design iteration time by facilitating quick convergence of timing constraints between a golden circuit design and a target circuit design. Using a point-based approach, the number of design iterations can be minimized to enable quick convergence of timing constraints between the golden circuit design and the target circuit design. Such approach can save on tool licensing, decrease the amount of hardware used for verification, and/or increase overall design productivity.

In one embodiment, a method includes receiving a target circuit design having a first netlist and a first set of timing constraints. A plurality of target attributes are extracted from the first netlist and the first set of timing constraints. An attribute mismatch on an attribute level is determined between the target circuit design and a golden circuit design by comparing the plurality of target attributes with a plurality of golden attributes of the golden circuit design. The attribute mismatch is provided for further design iterations and timing constrain modifications.

In another embodiment, a method includes receiving a target circuit design comprising a first netlist and a first set of timing constraints. A plurality of target attributes are extracted from the first netlist and the first set of timing constraints. An attribute mismatch between the target circuit design and a golden circuit design is determined by comparing the plurality of target attributes with a plurality of golden attributes of the golden circuit design. Such determination is achieved by determining whether a log for system design constraints associated with a golden circuit design contains any errors, evaluating the plurality of target attributes and the plurality of golden attributes, and determining a number of timing paths for each sequential cell between the first netlist and a second netlist of the golden circuit design is equivalent. The attribute mismatch is provided for further design iterations.

A non-transitory computer program product storing instructions which, when executed by at least one data processor forming part of at least one computing device result in operations including receiving a target circuit design comprising a first netlist and a first set of timing constraints. A plurality of target attributes are extracting from the first netlist and the first set of timing constraints. An attribute mismatch between the target circuit design and a golden circuit design is determined by comparing the plurality of target attributes with a plurality of golden attributes of the golden circuit design. The attribute mismatch is provided for further design iterations.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving a target circuit design;
determining an attribute mismatch between the target circuit design and a golden circuit design by:
determining whether a log for synthesis design constraints associated with the golden circuit design contains an error, wherein the target circuit design has a different technology node size than the golden circuit design;
evaluating a target attribute of the target circuit design and a golden attribute of the golden circuit design; and
determining whether a number of timing paths of the target circuit design and a number of timing paths of the golden circuit design are equivalent; and
providing the attribute mismatch for further design iterations, wherein at least one of the operations is performed by at least one data processor.

2. The method of claim 1, wherein the target circuit design is ported from the golden circuit design.

3. The method of claim 1, further comprising:
receiving the golden circuit design; and
extracting the golden attributes from a netlist and a set of timing constraints of the golden circuit design.

4. The method of claim 1, wherein the attribute mismatch comprises at least one of a missing false path, a missing clock attribute, a missing multi-cycle path, a missing attribute value, an incorrect false path, an incorrect clock attribute, an incorrect multi-cycle path, or an incorrect attribute value.

5. The method of claim 1, further comprising:
receiving a modified target circuit design comprising a netlist and a set of timing constraints, wherein the netlist and the set of timing constraints of the modified target circuit correct the attribute mismatch; and
repeating the determining and the providing using the netlist and the set of timing constraints of the modified target circuit.

6. The method of claim 1, wherein the technology size of the target design is smaller than the technology size of the golden circuit design.

7. The method of claim 1, wherein the technology size of the target design is larger than the technology size of the golden circuit design.

8. A system comprising:
one or more data processors configured to perform operations commanded by instructions stored in a non-transitory computer-readable medium, the instructions comprising:
receiving a target circuit design;
determining an attribute mismatch between the target circuit design and a golden circuit design by:
determining whether a log for synthesis design constraints associated with the golden circuit design contains an error, wherein the target circuit design has a different technology node size than the golden circuit design;
evaluating a target attribute of the target circuit design and a golden attribute of the golden circuit design; and
determining whether a number of timing paths of the target circuit design and a number of timing paths of the golden circuit design are equivalent;
providing the attribute mismatch for further design iterations; and
if no attribute mismatched is determined, fabricating an integrated circuit based on the target circuit design.

9. The system of claim 8, wherein the target circuit design is ported from the golden circuit design.

10. The system of claim 8, wherein the instructions further comprise:
receiving the golden circuit design; and
extracting the golden attributes from a netlist and a set of timing constraints of the golden circuit design.

11. The system of claim 8, wherein the attribute mismatch comprises at least one of a missing false path, a missing clock attribute, a missing multi-cycle path, a missing attribute value, an incorrect false path, an incorrect clock attribute, an incorrect multi-cycle path, or an incorrect attribute value.

12. The system of claim 8, wherein the instructions further comprise:
receiving a modified target circuit design comprising a netlist and a set of timing constraints, wherein the netlist and the set of timing constraints of the modified target circuit correct the attribute mismatch; and
repeating the determining and the providing using the netlist and the set of timing constraints of the modified target circuit.

13. The system of claim 8, wherein the technology size of the target design is smaller than the technology size of the golden circuit design.

14. The system of claim 8, wherein the technology size of the target design is larger than the technology size of the golden circuit design.

15. A non-transitory computer program product storing instructions which, when executed by at least one data processor of at least one computing device result in operations comprising:
receiving a target circuit design;
determining an attribute mismatch between the target circuit design and a golden circuit design by:
determining whether a log for synthesis design constraints associated with the golden circuit design contains an error, wherein the target circuit design has a different technology node size than the golden circuit design;
evaluating a target attribute of the target circuit design and a golden attribute of the golden circuit design; and
determining whether a number of timing paths of the target circuit design and a number of timing paths of the golden circuit design are equivalent; and
providing the attribute mismatch for further design iterations.

16. The non-transitory computer program product of claim 15, wherein the target circuit design is ported from the golden circuit design.

17. The non-transitory computer program product of claim 15, wherein the operations further comprise:
receiving the golden circuit design; and
extracting the golden attributes from a netlist and a set of timing constraints of the golden circuit design.

18. The non-transitory computer program product of claim 15, wherein the attribute mismatch comprises at least one of a missing false path, a missing clock attribute, a missing multi-cycle path, a missing attribute value, an incorrect false path, an incorrect clock attribute, an incorrect multi-cycle path, or an incorrect attribute value.

19. The non-transitory computer program product of claim 15, wherein the instruction further comprise:
    receiving a modified target circuit design comprising a netlist and a set of timing constraints, wherein the netlist and the set of timing constraints of the modified target circuit correct the attribute mismatch; and
    repeating the determining and the providing using the netlist and the set of timing constraints of the modified target circuit.

20. The non-transitory computer program product of claim 15, wherein the technology size of the target design is smaller or larger than the technology size of the golden circuit design.

\* \* \* \* \*